United States Patent [19]
Junck et al.

[11] Patent Number: 5,941,017
[45] Date of Patent: Aug. 24, 1999

[54] FISHING LEADER LINE STORAGE SYSTEM

[76] Inventors: Donald D Junck; Aaron M Junck, both of 26116 Canary Dr., Sioux Falls, S. Dak. 57107

[21] Appl. No.: 08/835,071

[22] Filed: Apr. 4, 1997

[51] Int. Cl.⁶ .................................................. A01K 97/06
[52] U.S. Cl. ............................................................ 43/57.2
[58] Field of Search .................................. 43/57.1, 57.2; 206/315.11; D22/134, 199

[56] References Cited

U.S. PATENT DOCUMENTS

| | | | |
|---|---|---|---|
| 258,393 | 5/1882 | Endicott | 43/57.2 |
| 592,493 | 10/1897 | Klinger | 43/57.2 |
| 674,984 | 5/1901 | Plumley | 43/57.2 |
| 1,133,846 | 3/1915 | Fath | 43/57.2 |
| 1,577,566 | 3/1926 | Cryder | 43/57.2 |
| 1,749,227 | 3/1930 | Pruett | 43/57.2 |
| 1,979,475 | 11/1934 | Knettles | 43/57.2 |
| 2,069,661 | 2/1937 | Tiede | 43/57.2 |
| 2,849,829 | 9/1958 | Fisher | 43/57.2 |
| 3,053,006 | 9/1962 | Horner | 43/57.2 |
| 4,040,202 | 8/1977 | Wille | 43/57.2 |
| 4,577,433 | 3/1986 | Jones | 43/57.2 |
| 4,691,471 | 9/1987 | Hansen | 43/57.2 |
| 4,924,621 | 5/1990 | Hawranik et al. | 43/57.2 |
| 5,018,298 | 5/1991 | Spears | 43/57.2 |
| 5,157,862 | 10/1992 | Companiony | 43/57.2 |
| 5,269,090 | 12/1993 | Richards et al. | 43/57.2 |
| 5,386,662 | 2/1995 | Vader et al. | 43/57.2 |
| 5,606,820 | 3/1997 | Suddeth | 43/57.2 |

*Primary Examiner*—Kurt Rowan
*Attorney, Agent, or Firm*—Kaardal & Associates, PC

[57] ABSTRACT

A new Fishing Leader Line Storage System for holding fishing leader lines having a looped end and a hook their other end. The inventive device includes a base panel having a portion forming a stationary panel. A hinge panel pivotally coupled to the base panel at its proximal end such that the hinge panel top face is positionable in a substantially coplanar relationship with the top face of the stationary panel. The stationary panel top face has a plurality of spaced apart loop supports at its proximal end for holding the looped end of a fishing leader line. A plurality of hook slots located at the hinge panel distal end allow insertion of the hooks of fishing leader lines extended from the loop supports. A finger guard member is extended from the distal end of the hinge panel bottom face below the hook slots to protect a user's fingers from hooks inserted into the hook slots. Positioned adjacent each side of the hinge panel top face is a stationary rib. Extending on the stationary plate top face towards its distal end are a plurality of spaced apart line guide members each having a pair of line guide slots that are aligned with the loop supports and the hook slots and designed for accepting fishing leader lines. A tension band is looped around the line guide members to help hold the fishing leader line within the line guide slots. The fishing leader line storage system is designed for use individually or in combination with a fishing tackle box and a jig panel that permits formation of appropriately sized fishing leader lines for storage.

20 Claims, 3 Drawing Sheets

FISHING LEADER LINE STORAGE SYSTEM

BACKGROUND OF THE INVENTION

1. Field of the Invention

The present invention relates to fishing leader line holders and more particularly pertains to a new Fishing Leader Line Storage System for holding fishing leader lines having a looped end and a hook their other end.

2. Description of the Prior Art

The use of fishing leader line holders is known in the prior art. More specifically, fishing leader line holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing leader line holders include U.S. Pat. 5,269,090; U.S. Pat. 5,157,862; U.S. Pat. 4,691,471; U.S. Pat. 4,040,202; U.S. Pat. 5,386,662; U.S. Pat. 5,018,298; and U.S. Pat. 4,924,621.

While these devices fulfill their respective, particular objectives and requirements, the aforementioned patents do not disclose a new Fishing Leader Line Storage System. The inventive device includes a base panel having a portion forming a stationary panel. A hinge panel pivotally coupled to the base panel at its proximal end such that the hinge panel top face is positionable in a substantially coplanar relationship with the top face of the stationary panel. The stationary panel top face has a plurality of spaced apart loop supports at its proximal end for holding the looped end of a fishing leader line. A plurality of hook slots located at the hinge panel distal end allow insertion of the hooks of fishing leader lines extended from the loop supports. A finger guard member is extended from the distal end of the hinge panel bottom face below the hook slots to protect a user's fingers from hooks inserted into the hook slots. Positioned adjacent each side of the hinge panel top face is a stationary rib. Extending on the stationary plate top face towards its distal end are a plurality of spaced apart line guide members each having a pair of line guide slots that are aligned with the loop supports and the hook slots and designed for accepting fishing leader lines. A tension band is looped around the line guide members to help hold the fishing leader line within the line guide slots. The fishing leader line storage system is designed for use individually or in combination with a fishing tackle box and a jig panel that permits formation of appropriately sized fishing leader lines for storage.

In these respects, the Fishing Leader Line Storage System according to the present invention substantially departs from the conventional concepts and designs of the prior art, and in so doing provides an apparatus primarily developed for the purpose of holding fishing leader lines having a looped end and a hook their other end.

SUMMARY OF THE INVENTION

In view of the foregoing disadvantages inherent in the known types of fishing leader line holders now present in the prior art, the present invention provides a new Fishing Leader Line Storage System construction wherein the same can be utilized for holding fishing leader lines having a looped end and a hook their other end.

The general purpose of the present invention, which will be described subsequently in greater detail, is to provide a new Fishing Leader Line Storage System apparatus and method which has many of the advantages of the fishing leader line holders mentioned heretofore and many novel features that result in a new Fishing Leader Line Storage System which is not anticipated, rendered obvious, suggested, or even implied by any of the prior art fishing leader line holders, either alone or in any combination thereof.

To attain this, the present invention generally comprises a base panel having a portion forming a stationary panel. A hinge panel pivotally coupled to the base panel at its proximal end such that the hinge panel top face is positionable in a substantially coplanar relationship with the top face of the stationary panel. The stationary panel top face has a plurality of spaced apart loop supports at its proximal end for holding the looped end of a fishing leader line. A plurality of hook slots located at the hinge panel distal end allow insertion of the hooks of fishing leader lines extended from the loop supports. A finger guard member is extended from the distal end of the hinge panel bottom face below the hook slots to protect a user's fingers from hooks inserted into the hook slots. Positioned adjacent each side of the hinge panel top face is a stationary rib. Extending on the stationary plate top face towards its distal end are a plurality of spaced apart line guide members each having a pair of line guide slots that are aligned with the loop supports and the hook slots and designed for accepting fishing leader lines. A tension band is looped around the line guide members to help hold the fishing leader line within the line guide slots. The fishing leader line storage system is designed for use individually or in combination with a fishing tackle box and a jig panel that permits formation of appropriately sized fishing leader lines for storage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Fishing Leader Line Storage System apparatus and method which has many of the advantages of the fishing leader line holders mentioned heretofore and many novel features that result in a new Fishing Leader Line Storage System which is not anticipated, rendered obvious, suggested, or even implied by any of the prior art fishing leader line holders, either alone or in any combination thereof.

It is another object of the present invention to provide a new Fishing Leader Line Storage System which may be easily and efficiently manufactured and marketed.

It is a further object of the present invention to provide a new Fishing Leader Line Storage System which is of a durable and reliable construction.

An even further object of the present invention is to provide a new Fishing Leader Line Storage System which is susceptible of a low cost of manufacture with regard to both materials and labor, and which accordingly is then susceptible of low prices of sale to the consuming public, thereby making such Fishing Leader Line Storage System economically available to the buying public.

Still yet another object of the present invention is to provide a new Fishing Leader Line Storage System which provides in the apparatuses and methods of the prior art some of the advantages thereof, while simultaneously overcoming some of the disadvantages normally associated therewith.

Still another object of the present invention is to provide a new Fishing Leader Line Storage System for holding fishing leader lines having a looped end and a hook their other end.

Yet another object of the present invention is to provide a new Fishing Leader Line Storage System which includes a base panel having a portion forming a stationary panel. A hinge panel pivotally coupled to the base panel at its proximal end such that the hinge panel top face is positionable in a substantially coplanar relationship with the top face of the stationary panel. The stationary panel top face has a plurality of spaced apart loop supports at its proximal end for holding the looped end of a fishing leader line. A plurality of hook slots located at the hinge panel distal end allow insertion of the hooks of fishing leader lines extended from the loop supports. A finger guard member is extended from the distal end of the hinge panel bottom face below the hook slots to protect a user's fingers from hooks inserted into the hook slots. Positioned adjacent each side of the hinge panel top face is a stationary rib. Extending on the stationary plate top face towards its distal end are a plurality of spaced apart line guide members each having a pair of line guide slots that are aligned with the loop supports and the hook slots and designed for accepting fishing leader lines. A tension band is looped around the line guide members to help hold the fishing leader line within the line guide slots. The fishing leader line storage system is designed for use individually or in combination with a fishing tackle box and a jig panel that permits formation of appropriately sized fishing leader lines for storage.

Still yet another object of the present invention is to provide a new Fishing Leader Line Storage System that allows convenient and tangle-free storage of fishing leader lines while fishing.

Even still another object of the present invention is to provide a new Fishing Leader Line Storage System that is designed for use individually or in combination with a fishing tackle box having an openable lid portion and a hollow interior with a plurality of compartment dividers within it for storing fishing equipment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
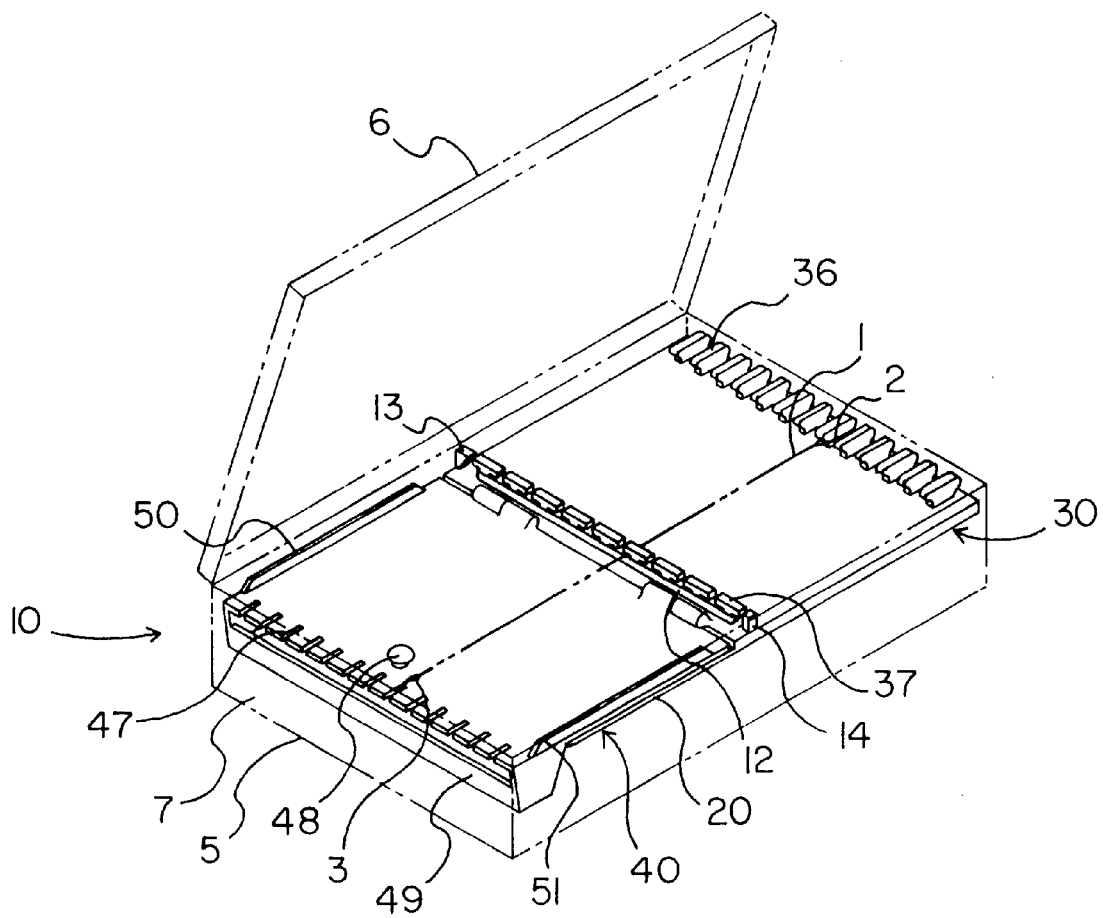
FIG. 1 is a schematic perspective view of a new Fishing Leader Line Storage System in a fishing tackle box according to the present invention.
Figure 2:
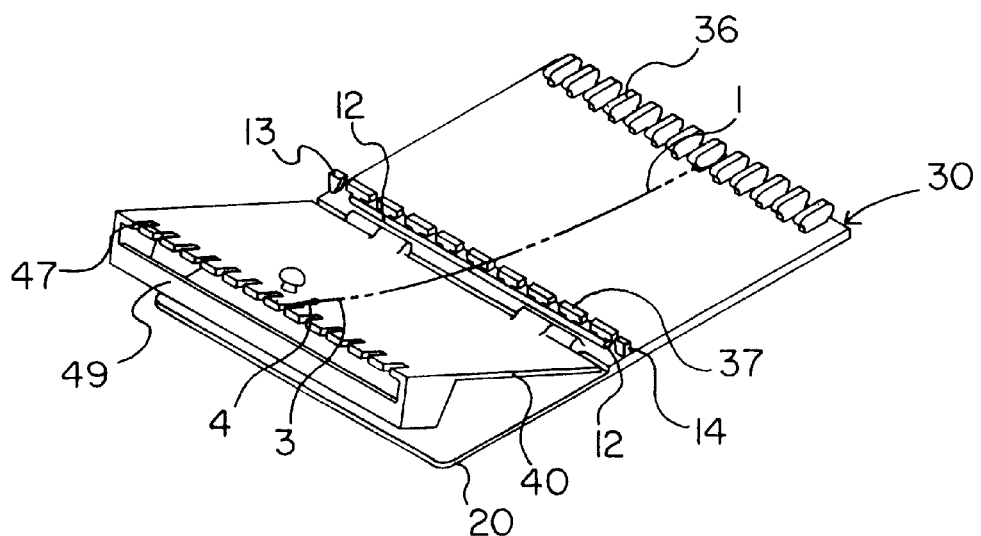
FIG. 2 is a schematic perspective view of the present invention with the hinge panel being pivoted from the base panel.
Figure 3:
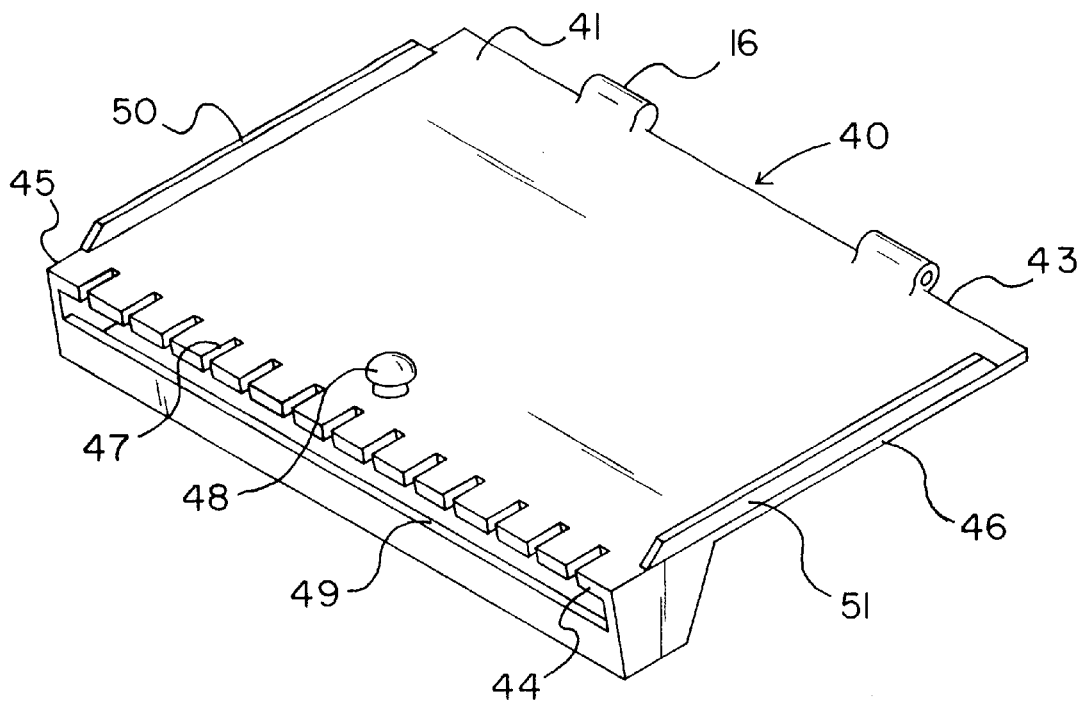
FIG. 3 is a schematic perspective view of the hinge panel.
Figure 4:
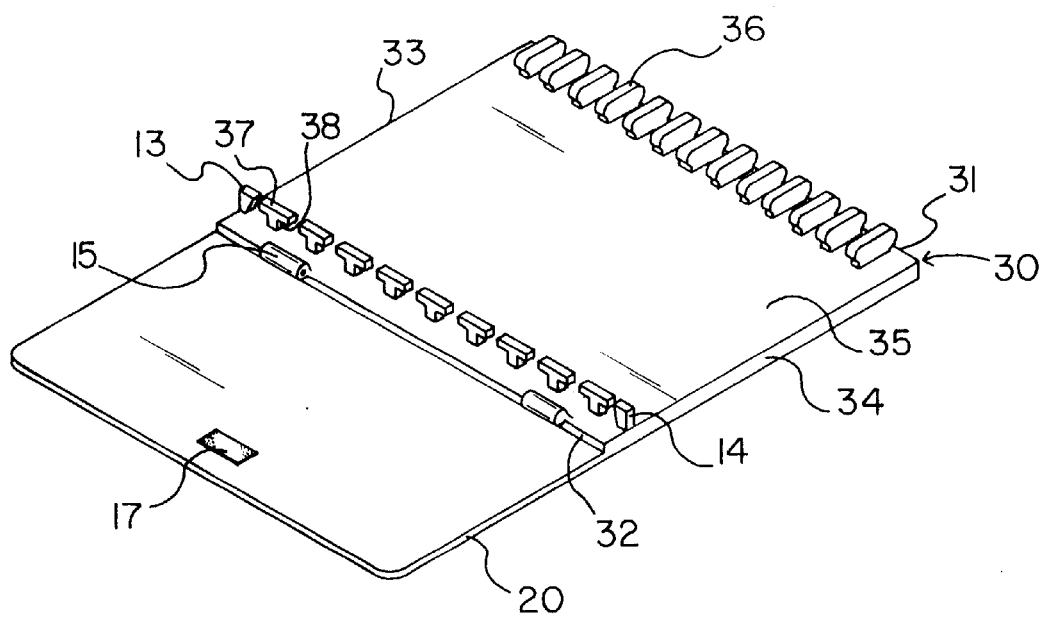
FIG. 4 is a schematic perspective view of the stationary panel showing the line guide members and the tension band.
Figure 5:
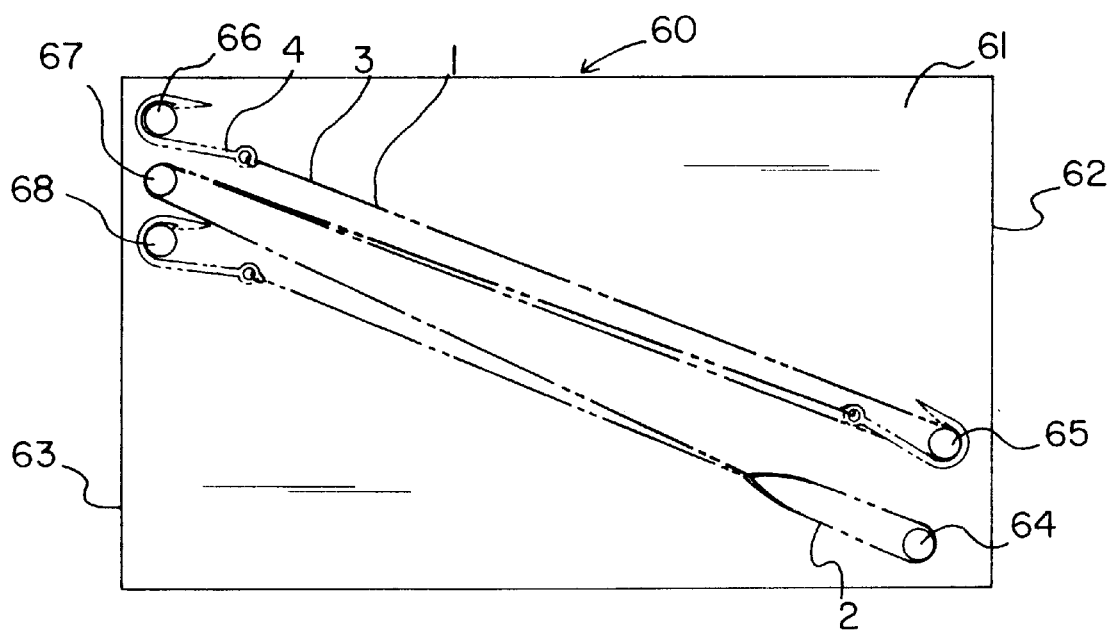
FIG. 5 is a schematic top plan view of the jig panel.
Figure 6:
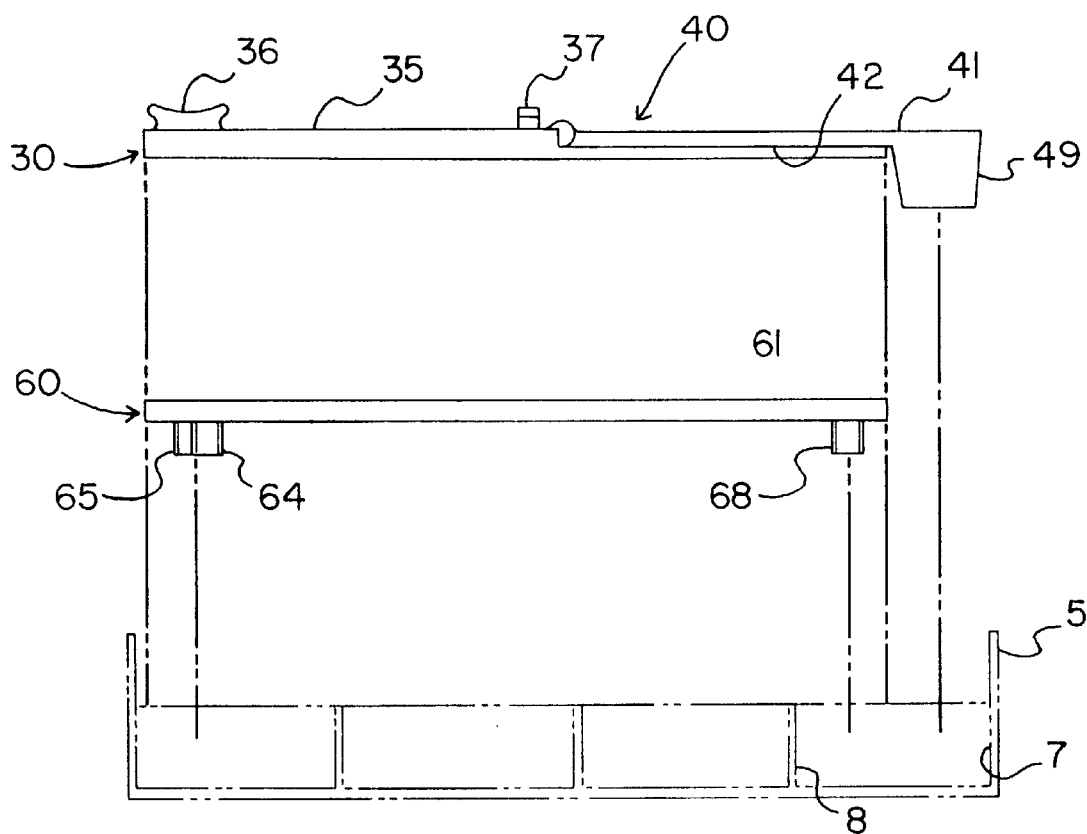
FIG. 6 is a schematic exploded side view of the present invention showing the positioning of the base panel and the jig panel within the interior of the fishing tackle box.

With reference now to the drawings, and in particular to FIGS. 1 through 6 thereof, a new fishing leader line storage system embodying the principles and concepts of the present invention and generally designated by the reference numeral 10 will be described.

As best illustrated in FIGS. 1 through 6, the fishing leader line storage system 10 generally comprises a base panel 20, a stationary panel 30, a plurality of loop supports 36, a plurality of line guide members 37, a tension band 12, a hinge panel 40, and a plurality of hook slots 47. The fishing leader line storage system 10 is designed for holding fishing leader lines 1 each having a looped end 2 and a hook 4 at its hook end 3. The fishing leader line storage system 10 is also designed for use individually or in combination with a fishing tackle box 5 having an openable lid portion 6 and a hollow interior 7 with a plurality of compartment dividers 8 within it for storing fishing equipment.

The stationary panel 30 is formed from a portion of the base panel 20. Preferably, the base panel is designed to fit within the hollow interior 7 of a tackle box 5 and may rest on the top of the compartment dividers 8. The stationary panel 30 has a top face 35, a proximal end 31, a distal end 32, and a pair of parallel sides 33,34.

Included on the stationary panel top face 35 are a plurality of spaced apart loop supports 36. The loop supports 36 are extended between the stationary panel sides 33,34 and positioned towards the proximal end 31 of the stationary panel 30. The loop supports 36 are each designed to hold the loop end 2 of a fishing leader line 1.

Also included on the stationary panel top face 35 are a plurality of spaced apart, T-shaped line guide members 37.

Each line guide members 37 defines a pair of line guide slots 38. The line guide members 37 are positioned towards the stationary panel distal end 32 and are extended between the stationary panel sides 33,34. The line guide members 37 are spaced apart so that each line guide slots 38 is aligned with a corresponding loop support 36. The line guide members 37 are designed to keep fishing leader lines 1 spaced apart and untangled during storage. The line guide slots 38 are each designed for accepting a fishing leader line 1 being extended from a loop support 36 to a hook slot 47. The line guide slots 38 also help to hold the fishing leader lines 1 securely to the fishing leader line storage system 10 when the hinge panel 40 is pivoted so that the hinge panel top face 41 and the stationary panel top face 35 are not aligned in the same plane.

The fishing leader line storage system 10 also includes a rubber tension band 12 which is looped around all of the line guide members 37 such that the tension band 12 extends between the sides 33,34 of the stationary panel 30. The tension band 12 is included in the invention to provide a means for helping hold the fishing leader lines 1 within each of the line guide slots 38. Preferably, the two line guide members 37 closest to the either support panel side 33,34 each have a tension band holding slot 13,14 which are slanted to help prevent the tension band 12 from slipping off from around the line guide members 37.

The hinge panel 40 has a top face 41, a bottom face 42, a proximal end 43, a distal end 44, and a pair of substantially parallel sides 45,46. The proximal end 43 is pivotally coupled by a pair of hinges 15,16 to the base panel 20 such that the hinge panel top face 41 may be positioned in a substantially coplanar relationship with the stationary panel top face 35.

The distal end 44 of the hinge panel 40 has a plurality of spaced apart hook slots 47 extending between the hinge panel sides 45,46. Each hook slot is designed to accept a hook 4 on the fishing leader line hook end 3. Optionally, the looped end 2 of fishing leader lines 1 may be looped around two adjacent hook slots 47 to permit tangle free storage of fishing leader lines 1 whose lengths are twice the distance between the loop supports 36 and a hook slots 47.

Positioned at the distal end 44, there is a finger guard member 49 on the hinge panel bottom face 42. The finger guard member 49 extends between the hinge panel sides 45,46 and depends from the bottom face 42 below the hook slots 47. The finger guard member helps protect a user's fingers from injury from hooks 4 accepted by one of the hook slots 47.

Positioned adjacent each of the hinge panel sides 45,46 is a stationary rib 50,51 extending from the hinge plate top face 41. When the fishing leader line storage system 10 is positioned within a fishing tackle box 5 the stationary ribs 50,51 help hold the fishing leader line storage system 10 against the fishing tackle box lid 6.

Preferably, the hinge panel distal end 44 is detachably attached to the base panel 20 to hold the hinge plate in the coplanar position and to prevent unnecessary movement of the hinge plate while storing fishing leader lines 1. Ideally, hinge panel distal end 44 is detachably attached to the base panel by a removable fastener such as a hook and loop fastener 17 attached to the hinge panel bottom face 42 and the base panel 20. Even more ideally, the hinge panel top face 41 also includes a lifting tab 48. The lifting tab 48 helps detach the hinge panel 40 from the base panel 20 and also helps position the hinge panel distal end 44 in relation to the base panel 20.

The fishing leader line storage system 10 also includes a jig panel 60 for forming fishing leader lines 1 of particular given lengths so that they may be attached to a loop support 36 and a corresponding hook slot 47. Included on the jig panel top face 61 near the proximal end 62 is a loop tying peg 64. The loop tying peg 64 is to help form and tie the fishing leader line looped ends 2 that can be attached to a loop support 36.

Extending from the jig panel top face 61 near its distal end 63 are a plurality of spaced apart looping pegs 66–68. A looping peg 65 is also extended from the top face 61 near the proximal end 62 and is spaced apart from the loop tying peg 64. The looping pegs 65–68 are for attaching the hook 4 on a fishing leader line 1 and are spaced apart to help form a fishing leader line 1 of particular lengths that may be for extended between the loop supports 36 and the hook slots 47. For example, if the fishing leader line storage system 10 is designed to hold fishing leader lines 1 twelve inches in length, then it is recommended that the looping pegs be spaced apart to be permit formation of leader lines of twelve inches, twenty six inches and thirty eight inches.

The jig panel 60 is designed so that it may be placed in the hollow interior 7 of a tackle box 5. It is recommend that the jig panel is placed in the in fishing tackle box 5 upside down with the pegs 64–68 extending into the compartments formed by the dividers 8 when stored within a tackle box 5 along with the rest of the fishing leader line storage system 10.

In use, the fishing leader line storage system 10 is designed for holding fishing leader lines 1 by attaching it looped end 2 to a loop support 36 and extending the leader line hook end to the hinge plate distal end 44 to insert the hook into the similarly aligned hook slot 47. The fishing leader line 1 is then positioned into the corresponding similarly aligned line guide slot 38. When storing fishing leader lines 1, the hinge panel top face 41 should be coplanar with the stationary panel top face 35. This alignment keeps the fishing leader lines 1 extended taut between the loop support 36 and the hook slot 47.

When removing a fishing leader line 1 from the fishing leader line storage system 10, the fishing leader line 1 is first removed from the line guide slot 38. Next, the lifting tab 48 is pulled so that the hinge panel distal end 44 is detached from the base panel 20 and the hinge panel 40 is pivoted in relation to the stationary panel 30 so that their top faces 35,41 are no longer coplanar. This causes the fishing leader line 1 to be held loosely by the loop support 36 and the hook slot 47. The looped end 2 and the hook 4 may then be easily detached from the fishing leader line storage system 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A fishing leader line storage system for use individually or in combination with a fishing tackle box, said fishing leader line storage system being for holding a fishing leader line having a looped end and a hook at its hook end, said fishing leader line storage system comprising:

a base panel having a portion forming a stationary panel;

said stationary panel having a top face, a proximal end, a distal end;

a loop support being included on said stationary panel top face and being positioned towards said stationary panel proximal end, said loop support being for holding a fishing leader line looped end;

a hinge panel having a top face, a proximal end, and distal end, said hinge panel proximal end being pivotally coupled to said base panel at a junction between said base panel and said stationary panel, said hinge panel top face being positionable in a substantially coplanar relationship with said stationary panel top face, said hinge panel distal end being detachably attached to said base panel;

a hook slot being included on said hinge panel distal end, said hook slot being for accepting a fishing leader line hook end hook;

a line guide member being included on said stationary panel top face and being positioned towards said stationary panel distal end, said line guide member having a line guide slot, said line guide slot being aligned with said loop support, said line guide slot being for accepting a fishing leader line being extended from said loop support to said hook slot; and a means for helping hold a fishing leader line within said line guide slot.

2. The fishing leader line storage system of claim 1, wherein said stationary panel has a pair of sides, and wherein said stationary panel top face has a plurality loop supports, said loop supports being spaced apart and being extended between said stationary panel sides.

3. The fishing leader line storage system of claim 2, wherein said stationary panel top face has a plurality of spaced apart line guide members being extended between said stationary panel sides, said line guide slots being aligned with said loop supports.

4. The fishing leader line storage system of claim 3, wherein each line guide member has a pair of line guide slots.

5. The fishing leader line storage system of claim 3, wherein said means for helping hold a fishing leader line within said line guide slot is a tension band being looped around said plurality of line guide members such that said tension band is extended between said stationary panel sides.

6. The fishing leader line storage system of claim 1, wherein said hinge panel top face has a lifting tab being for helping position said hinge panel top face distal end in relation to said base panel.

7. The fishing leader line storage system of claim 1, wherein said hinge panel has a pair of substantially parallel sides, and wherein said hinge panel distal end has a plurality of hook slots being extended between said hinge panel sides.

8. The fishing leader line storage system of claim 1, wherein said hinge panel has a bottom face and a pair of substantially parallel sides, said hinge panel bottom face having a finger guard member being extended between said hinge panel sides, said finger guard member being for helping protect a user's fingers from a hook being accepted by said hook slot.

9. The fishing leader line storage system of claim 1, wherein said hinge panel has a pair of substantially parallel sides, and wherein adjacent each of said hinge panel sides is a stationary rib being extended from said hinge plate top face, said stationary ribs being for helping securely hold the fishing leader line storage system within a fishing tackle box.

10. The fishing leader line storage system of claim 1, wherein said base panel has opposite proximal and distal ends, said junction being located in a middle region between said base panel proximal and distal ends such that said hinge panel is coupled to said base panel between said base panel proximal and distal ends.

11. The fishing leader line storage system of claim 10, wherein said hinge panel has a bottom face and wherein said removable fastener is a hook and loop fastener being for attaching said hinge panel bottom face to said base panel.

12. The fishing leader line storage system of claim 1, further comprising a fishing tackle box having a hollow interior and an openable lid portion.

13. The fishing leader line storage system of claim 1, further comprising a jig panel having a top face, a loop tying peg and at least one looping peg, said loop tying peg being extended from said jig panel top face, said looping peg being extended from said jig panel top face, said loop tying peg being for forming and tying a fishing leader line looped end for attachment to said loop support, said looping peg being for attaching a fishing leader line hook end hook and forming a fishing leader line of a given length for extending between said loop support and said hook slots.

14. The fishing leader line storage system of claim 13, wherein said jig panel has a proximal end and a distal end, and wherein said jig panel top face has a plurality of looping pegs, said loop tying peg and one of said looping pegs being positioned towards said proximal end, and wherein the remaining looping pegs are positioned towards said jig panel distal end.

15. The fishing leader line storage system of claim 13, further comprising a fishing tackle box.

16. A fishing leader line storage system for use individually or in combination with a fishing tackle box and being for holding a plurality of fishing leader lines each having a looped end and a hook end having a hook, said fishing leader line storage system comprising:

a base panel having a portion forming a stationary panel, said base panel being for placement within a fishing tackle box;

said base panel being generally rectangular and having opposite proximal and distal ends;

said stationary panel having a top face, a proximal end, a distal end, a first side and a second side;

said stationary panel proximal end being positioned adjacent said base panel proximal end of said such that said proximal ends of said base panel and said stationary panel lie in a common plane;

said stationary panel distal end being positioned between said base panel distal and proximal ends;

a plurality of spaced apart loop supports being included on said stationary panel top face, said loop supports being extended between said stationary panel first side and said stationary panel second side, said loop supports being positioned towards said stationary panel proximal end, each said loop supports being for holding a fishing leader line looped end;

a plurality of spaced apart line guide members being included on said stationary panel top face, said line guide members being extended between said stationary panel first side and said stationary panel second side, said line guide members being positioned towards said stationary panel distal end, each said line guide member having a pair of line guide slots, said line guide slots being aligned with said loop supports, each said line guide slots being for accepting a fishing leader line;

a tension band being looped around said line guide members such that said tension band is extended between said stationary panel first side and said stationary panel second side, said tension band being for providing a means for helping hold a fishing leader line within each of said line guide slots;

a hinge panel having a top face, a bottom face, a first side, a second side, a proximal end, and a distal end, said proximal end being pivotally coupled to said base panel adjacent said stationary panel distal end such that said hinge panel proximal end is positioned between said base panel proximal and distal ends, said hinge panel top face being positionable in a substantially coplanar relationship with said stationary panel top face, said hinge panel distal end having a plurality of hook slots being extended between said hinge panel first side and said hinge panel second side, each said hook slots being for accepting a fishing leader line hook end hook, said hinge panel top face having a lifting tab, said lifting tab being for helping position said hinge panel top face distal end in relation to said base panel, said hinge panel bottom face having a finger guard member being extended between said hinge panel first side and said hinge panel second side, said finger guard member being for helping protect a user's fingers from a hook being accepted by one of said hook slots, said hinge panel distal end being detachably attached to said base panel;

a first stationary rib being extended from said hinge panel top face and being positioned towards said hinge panel first side, said first stationary rib being for helping securely hold said fishing leader line storage system within a fishing tackle box; and a second stationary rib being extended from said hinge panel top face and being positioned towards said hinge panel second side, said second stationary rib being for helping securely hold said fishing leader line storage system within a fishing tackle box.

17. The fishing leader line storage system of claim 16, further comprising a jig panel having a top face, a loop tying peg and at least one looping peg, said loop tying peg being extended from said jig panel top face, said looping peg being extended from said jig panel top face, said loop tying peg being for forming and tying a fishing leader line looped end for attachment to said loop support, said looping peg being for attaching a fishing leader line hook end hook and forming a fishing leader line of a given length for extending between said loop support and said hook slots.

18. The fishing leader line storage system of claim 16, further comprising a fishing tackle box.

19. A fishing leader line storage system, comprising:

a base panel having a top face and opposite proximal and distal ends;

said base panel having a raised portion upwardly extending from said top face of said base panel to form a stationary panel;

said stationary panel having a top face, and opposite proximal and distal ends;

said proximal end of said stationary panel being positioned adjacent said proximal end of said base panel;

said distal end of said stationary panel distal end being positioned between said proximal and distal ends of said base panel;

a plurality of spaced apart loop supports upwardly extending from said top face of said stationary panel;

said loop supports being positioned adjacent said proximal end of said stationary panel;

a plurality of spaced apart line guide members upwardly extending from said top face of said stationary panel;

said line guide members being positioned towards said distal end of said stationary panel;

each said line guide member defining a pair of line guide slots;

a tension band being looped around said line guide members;

a hinge panel having a top and bottom faces, opposite proximal and distal ends;

said distal end of said hinge panel having a plurality of spaced apart hook slots; and said proximal end of said hinge panel being pivotally coupled to said base panel adjacent said distal end of said stationary panel such that said proximal end of said hinge panel is positioned between said proximal and distal ends of said base panel.

20. The fishing leader line storage system of claim 19, wherein:

said base panel is generally rectangular;

wherein said proximal and distal ends of said base panel are extended substantially parallel to one another;

wherein said top face of said stationary panel is generally rectangular and said stationary panel has first and second sides extending between said proximal and distal ends of said stationary panel;

wherein said proximal ends of said base panel and said stationary panel lie in a common plane;

wherein said distal end of said stationary panel distal end is positioned in a middle region located generally equidistant between said proximal and distal ends of said base panel;

wherein said loop supports are arranged in a row extending between first and second sides of said stationary panel;

wherein said line guide members are arranged in a row extending between said first and second sides of said stationary panel;

wherein each said line guide member is generally T-shaped and wherein said line guide slots are aligned with said loop supports;

wherein said tension band is looped around said line guide members such that said tension band extends between said first and second sides of said stationary panel;

wherein said hinge panel has first and second sides extending between said proximal and distal ends of said hinge panel;

wherein said hinge panel is pivotable to a position wherein said top face of said hinge panel is generally coplanar with said stationary panel top face and said distal end of said hinge panel is positioned adjacent said distal end of said base panel;

wherein said hooks slots are arranged in a row extending between said first and second sides of said hinge panel;

wherein said hinge panel has a lifting tab coupled to said top face of said hinge panel, said lifting tab being located towards said distal end of said hinge panel such that said hook slots are positioned between said lifting tab and said distal end of said hinge panel;

wherein said bottom face of said hinge panel has a finger guard member extending therefrom, said hinge panel being extended between said first and second sides of said hinge panel;

wherein said distal end of said hinge panel is detachably attached to said base panel;

wherein a first stationary rib is extended from said top face of said hinge panel and is positioned towards said first side of said hinge panel; and wherein a second stationary rib is extended from said top face of said hinge panel and is positioned towards said second side of said hinge panel.

* * * * *